US011695967B2

(12) United States Patent
Furht et al.

(10) Patent No.: US 11,695,967 B2
(45) Date of Patent: Jul. 4, 2023

(54) BLOCK LEVEL GEOMETRIC PARTITIONING

(71) Applicant: OP Solutions, LLC, Newton, MA (US)

(72) Inventors: Borivoje Furht, Boca Raton, FL (US); Hari Kalva, Boca Raton, FL (US)

(73) Assignee: OP Solutions, LLC, Amherst, MA (US)

( * ) Notice: Subject to any disclaimer, the term of this patent is extended or adjusted under 35 U.S.C. 154(b) by 0 days.

(21) Appl. No.: 17/254,494

(22) PCT Filed: Jun. 21, 2019

(86) PCT No.: PCT/US2019/038499
§ 371 (c)(1),
(2) Date: Dec. 21, 2020

(87) PCT Pub. No.: WO2019/246535
PCT Pub. Date: Dec. 26, 2019

(65) Prior Publication Data
US 2021/0168409 A1 Jun. 3, 2021

Related U.S. Application Data

(60) Provisional application No. 62/688,552, filed on Jun. 22, 2018.

(51) Int. Cl.
*H04N 19/96* (2014.01)
*H04N 19/176* (2014.01)
(Continued)

(52) U.S. Cl.
CPC ........... *H04N 19/96* (2014.11); *H04N 19/176* (2014.11); *H04N 19/184* (2014.11); *H04N 19/52* (2014.11)

(58) Field of Classification Search
CPC ...... H04N 19/176; H04N 19/70; H04N 19/96; H04N 19/159; H04N 19/105
See application file for complete search history.

(56) References Cited

U.S. PATENT DOCUMENTS 9,159,141 B2    10/2015  Bordes et al.
9,900,610 B2 *   2/2018  Song ..................... H04N 19/61
(Continued)

FOREIGN PATENT DOCUMENTS

EP      2446627 A1      5/2021
WO   2011/130186 A2   10/2011
(Continued)

OTHER PUBLICATIONS

PCT/US2019/038499; International Search Report; dated May 9, 2019.
(Continued)

*Primary Examiner* — Daniel Chang
(74) *Attorney, Agent, or Firm* — OP Solutions IP Department; Paul Ackerman

(57) ABSTRACT

A decoder is configured to decode a bitstream having a block based geometric partition having a plurality of orthogonal block boundaries by assigning a first plurality blocks on one side of an angled line segment a first common motion vector and by assigning a second plurality of blocks on the other side of the angled line segment a second common motion vector different than the first common motion vector. The decoder reconstructs the first plurality of blocks using the first common motion vector and the blocks in the second plurality of blocks using the second common motion vector.

11 Claims, 11 Drawing Sheets

(51) Int. Cl.
 *H04N 19/184* (2014.01)
 *H04N 19/52* (2014.01)

(56) References Cited

U.S. PATENT DOCUMENTS

| | | | |
|---|---|---|---|
| 9,924,181 B2 | 3/2018 | Chuang | |
| 10,212,427 B2* | 2/2019 | Lee | H04N 19/30 |
| 10,334,258 B2 | 6/2019 | Sim | |
| 10,666,936 B2 | 5/2020 | Lee | |
| 11,102,517 B2* | 8/2021 | Lim | H04N 19/96 |
| 2002/0196342 A1 | 12/2002 | Walker et al. | |
| 2003/0076325 A1 | 4/2003 | Thrasher | |
| 2007/0172117 A1 | 7/2007 | Wong | |
| 2009/0196342 A1 | 8/2009 | Divorra Escoda et al. | |
| 2010/0195715 A1* | 8/2010 | Liu | H04N 19/176 |
| | | | 375/E7.126 |
| 2010/0208818 A1 | 8/2010 | Yin et al. | |
| 2011/0200109 A1* | 8/2011 | Joshi | H04N 19/137 |
| | | | 375/E7.115 |
| 2011/0200111 A1* | 8/2011 | Chen | H04N 19/137 |
| | | | 375/240.16 |
| 2012/0147961 A1* | 6/2012 | Guo | H04N 19/17 |
| | | | 375/240.16 |
| 2013/0039423 A1* | 2/2013 | Helle | H04N 19/52 |
| | | | 375/E7.125 |
| 2013/0044816 A1* | 2/2013 | Amano | H04N 19/182 |
| | | | 375/E7.125 |
| 2013/0208982 A1 | 8/2013 | Bordes | |
| 2013/0287109 A1 | 10/2013 | Wang et al. | |
| 2014/0247876 A1 | 9/2014 | Moriya et al. | |
| 2014/0301470 A1 | 10/2014 | Yie et al. | |
| 2014/0341290 A1* | 11/2014 | Merkle | H04N 19/70 |
| | | | 375/240.16 |
| 2015/0271517 A1 | 9/2015 | Pang et al. | |
| 2016/0162548 A1 | 6/2016 | Dickie et al. | |
| 2018/0063528 A1 | 3/2018 | An et al. | |
| 2018/0077423 A1 | 3/2018 | Xu et al. | |
| 2018/0124398 A1* | 5/2018 | Park | H04N 19/107 |
| 2018/0278932 A1 | 9/2018 | Mukherjee et al. | |
| 2019/0174136 A1* | 6/2019 | Jun | H04N 19/513 |
| 2019/0200040 A1* | 6/2019 | Lim | H04N 19/176 |
| 2019/0208199 A1* | 7/2019 | Cho | H04N 19/176 |
| 2019/0246103 A1* | 8/2019 | Jun | H04N 19/119 |
| 2019/0273921 A1* | 9/2019 | Abe | H04N 19/176 |
| 2019/0297325 A1* | 9/2019 | Lim | H04N 19/51 |
| 2019/0313102 A1* | 10/2019 | Cho | H04N 19/132 |
| 2019/0335208 A1* | 10/2019 | Lim | H04N 19/647 |
| 2020/0007882 A1* | 1/2020 | Abe | H04N 19/198 |
| 2020/0014947 A1* | 1/2020 | Abe | H04N 19/537 |
| 2020/0014948 A1* | 1/2020 | Lai | H04N 19/139 |
| 2020/0014950 A1* | 1/2020 | Abe | H04N 19/537 |
| 2021/0168398 A1* | 6/2021 | Ahn | H04N 19/176 |
| 2021/0218977 A1 | 7/2021 | Kalva et al. | |
| 2021/0243461 A1 | 8/2021 | Park | |
| 2021/0274162 A1 | 9/2021 | Ahn | |
| 2021/0289198 A1 | 9/2021 | Liao et al. | |

FOREIGN PATENT DOCUMENTS

| | | |
|---|---|---|
| WO | 2018/034373 A1 | 2/2018 |
| WO | 2019246535 A1 | 6/2019 |
| WO | 2020116402 A1 | 6/2020 |
| WO | 2020159988 A1 | 8/2020 |
| WO | 2011130186 A2 | 4/2022 |

OTHER PUBLICATIONS

Lucas et al, "Intra Predictive Depth Map Coding Using Flexible Block Partitioning," IEEE Transactions on Image Processing, vol. 24, No. 11, Nov. 2015.

Blaser et al, "Geometry-base Partitioning for Predictive Video Coding with Transform Adaptation," IEEE PCS, Jun. 2018, 978-1-5386-4160.

Extended Search Report in EP 19869208.9.

Divorra et al, "Geometry-adaptive Block Partitioning," Video Coding Experts Group, 32nd Meeting, San Jose, CA, VCEG-AF10, Apr. 2007.

Blaser et al "Description of SDR and 360 Video Coding Technology proposal by RWTH Aachen University", JVET Meeting 20180410-20180420, San Diego. JVET-J0023, Apr. 2018.

Geometric Deriving MV for Motion Prediction in Block Based Video Coding 2017.

Geometry-based Partitioning for Predictive Coding with Transform Adaptation 2018.

Chen et al., "Algorithm Description for Versatile Video Coding and Test Model 3 (VTM 3)," 12th Meeting, Macao, CN. JVET-L1002-V1, Oct. 2018.

Extended search report issued by the European Patent Office in EPO 198223266.2.

Blaser et al., "Description of SDR and 360 video coding technology proposal by RWTH Aachen University" JVET Meeting, Apr. 10, 2018-Apr. 20, 2018, Sand Diego ISO/IEC JTC1/SC29/WG11 and ITU-T SG.16, JVET—J0023, Apr. 2018.

Lucas et al., "Intra Predictive Depth Map Coding Using Flexible Block Partioning", IEEE Transactions on Image Processing, IEEE, USA, Nov. 2015, pp. 4055-4068, XP011666114.

* cited by examiner

BLOCK LEVEL GEOMETRIC PARTITIONING

CROSS-REFERENCE TO RELATED APPLICATIONS

This application is a national phase application of International Application No. PCT/US2019/038499, filed on Jun. 21, 2019 and entitled "Block Level Geometric Partitioning", which claims priority to U.S. Provisional Patent Application No. 62/688,552 filed Jun. 22, 2018. The entirety of each of International Application No. PCT/US2019/038499 and U.S. Provisional Patent Application No. 62/688,552 is hereby expressly incorporated by reference herein.

FIELD OF THE INVENTION

The subject matter described herein relates to video compression including decoding and encoding.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

SUMMARY OF THE DISCLOSURE

In an aspect, a decoder includes circuitry configured to receive a bitstream, determine whether a block level geometric partitioning mode is enabled, determine a partitioning of a block into a first region and a second region, and reconstruct pixel data of the block.

In another aspect, a decoder includes circuitry configured to receive a bitstream, extract from the bitstream a parameter defining a line segment partitioning a block into a first region and a second region and reconstruct pixel data of the block. The parameter includes an index characterizing a predefined angle, a predefined position, and/or a predefined template line segment.

In yet another aspect, a decoder includes circuitry configured to receive a bitstream, determine whether a block level geometric partitioning mode is enabled, determine a line segment partitioning a block into a first region and a second region, and reconstruct pixel data of the block and using the line segment.

In yet another aspect, a decoder includes circuitry configured to receive a bitstream, determine whether a block level geometric partitioning mode is enabled, determine a first line segment for a block, determine a second line segment for the block, and reconstruct pixel data using the first line segment and the second line segment. The first line segment and the second line segment partitioning the block into a first region, a second region, and a third region.

One or more of the following features can be included in any feasible combination. For example, the first region can include sub-blocks sized 2×2 or greater. The second region can include sub-blocks sized 2×2 or greater. The block level geometric partitioning mode can be signaled in the bitstream. The line segment partitioning the block into the first region and the second region can be characterized by indices of two sub-blocks within the block.

Determining the partitioning of the block can include determining sub-blocks of the block and the partitioning can be according to the sub-blocks. Determining the partitioning of the block can include determining sub-blocks of the block and assigning each sub-block to the first region or the second region. The block level geometric partitioning mode can include a triangular partitioning mode. The first region and the second region can be triangular shaped. The block can be partitioned into the first region and the second region along a line segment characterized by a location specifying the upper left corner location of the block or an upper right corner location of the block.

Reconstructing pixel data can include computing a predictor for the first region using an associated motion vector contained in the bitstream.

The decoder can include an entropy decoder processor configured to receive the bit stream and decode the bitstream into quantized coefficients; an inverse quantization and inverse transformation processor configured to process the quantized coefficients including performing an inverse discrete cosine; a deblocking filter; a frame buffer; and an intra prediction processor.

The bitstream can include a parameter indicating whether block level geometric partitioning mode is enabled for the block. The block can form part of a quadtree plus binary decision tree. The block can be a non-leaf node of the quadtree plus binary decision tree. The block can be a coding tree unit or a coding unit. The first region can be a coding unit or a prediction unit.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Like reference symbols in the various drawings indicate like elements.

DETAILED DESCRIPTION

Some implementations of the current subject matter include partitioning a rectangular region into flexible geometric regions that can be more efficient to compute. Geometric partitioning can be performed at the block level (e.g., 2×2, 4×4, and the like) rather than at the pixel level. In some implementations, geometric partitioning at the block level can include partitioning a block into non-overlapping and rectangular sub-blocks (e.g., 2×2, 4×4, and the like), and then partitioning the block according to those sub-blocks into non-rectangular regions that can include multiple rectangular sub-blocks. Geometric partitions at the block level can be determined (e.g., implemented) by signaling starting and ending sub-block indices that partition the block. The straight line connecting the signaled sub-blocks can characterize the partition. Block level geometric partitioning can reduce complexity and increase compression efficiency.

Motion compensation can include an approach to predict a video frame or a portion thereof given the previous and/or future frames by accounting for motion of the camera and/or objects in the video. It can be employed in the encoding and decoding of video data for video compression, for example in the encoding and decoding using the Motion Picture Experts Group (MPEG)-2 (also referred to as advanced video coding (AVC)) standard. Motion compensation can describe a picture in terms of the transformation of a reference picture to the current picture. The reference picture can be previous in time or from the future when compared to the current picture. When images can be accurately synthesized from previously transmitted and/or stored images, the compression efficiency can be improved.

Block partitioning can refer to a method in video coding to find regions of similar motion. Some form of block partitioning can be found in video codec standards including MPEG-2, H.264 (also referred to as AVC or MPEG-4 Part 10), and H.265 (also referred to as High Efficiency Video Coding (HEVC)). In example block partitioning approaches, non-overlapping blocks of a video frame can be partitioned into rectangular sub-blocks to find block partitions that contain pixels with similar motion. This approach can work well when all pixels of a block partition have similar motion. Motion of pixels in a block can be determined relative to previously coded frames.

Figure 1:
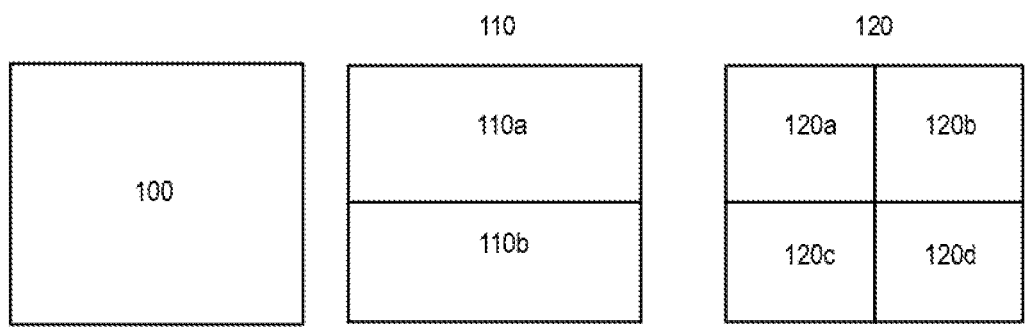
FIG. 1 is diagram illustrating an example of block partitioning of pixels.

FIG. 1 is diagram illustrating an example of block partitioning of pixels. An initial rectangular picture or block 100, which may itself be a sub-block (e.g., a node within a coding tree), can be partitioned into rectangular sub-blocks. For example, at 110, block 100 is partitioned into two rectangular sub-blocks 110a and 110b. Sub-blocks 110a and 110b can then be processed separately. As another example, at 120, block 100 is partitioned into four rectangular sub-blocks 120a, 120b, 120c, and 120d. Sub-blocks may themselves be further divided until it is determined that the pixels within the sub-blocks share the same motion, a minimum block size is reached, or another criterion. When pixels in a sub-block have similar motion, a motion vector can describe the motion of all pixels in that region.

Figure 2:
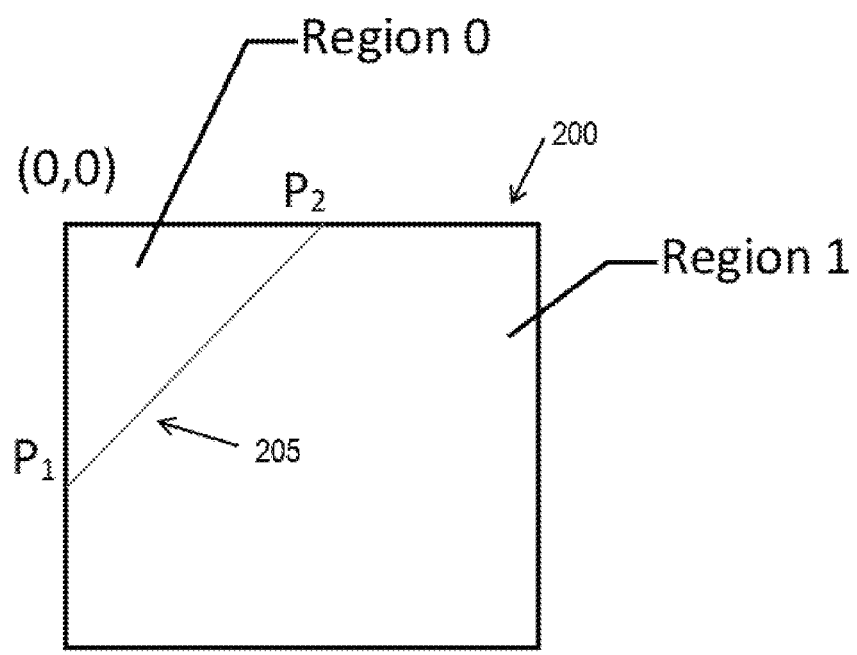
FIG. 2 is a diagram illustrating an example of geometric partitioning at the pixel level.

Some approaches to video coding can include geometric partitioning at the pixel level in which a rectangular block (e.g., as illustrated in FIG. 1) is further divided into two regions that may be non-rectangular. For example, FIG. 2 is a diagram illustrating an example of geometric partitioning at the pixel level. An example rectangular block 200 (which can have a width of M pixels and a height of N pixels, denoted as M×N pixels) can be divided along a line segment $P_1P_2$ 205 into two regions (region 0 and region 1). When pixels in region 0 have similar motion, a motion vector can describe the motion of all pixels in that region. The motion vector can be used to compress region 0. Similarly, when pixels in region 1 have similar motion, an associated motion vector can describe the motion of pixels in region 1. Such a geometric partition can be signaled to the receiver (e.g., decoder) by encoding positions $P_1$ and $P_2$ (or representations of positions $P_1$ and $P_2$) in the video bitstream.

Figure 11:
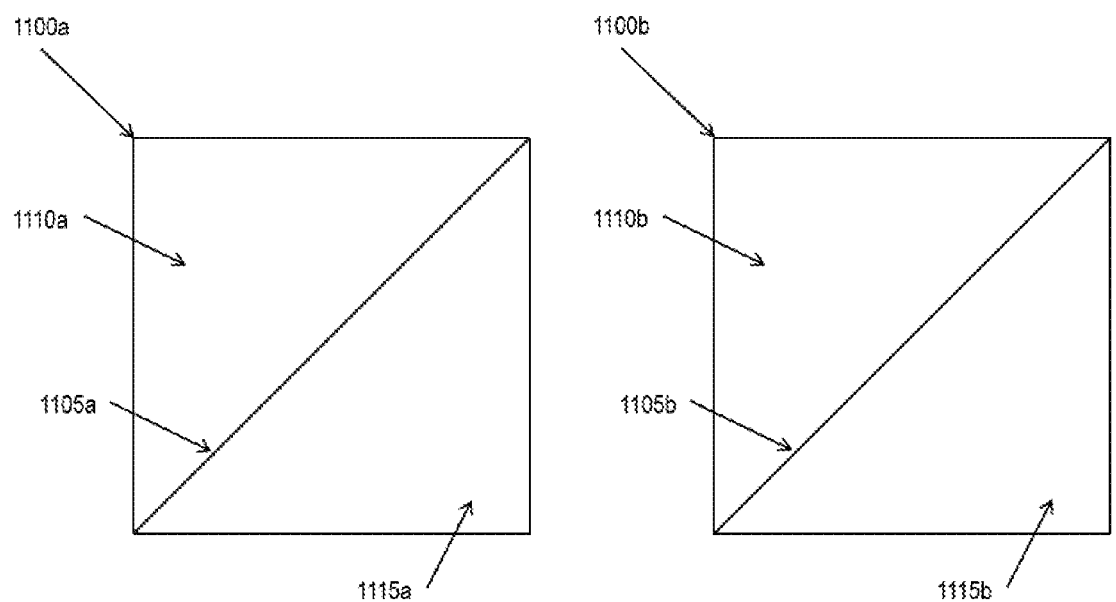
FIG. 11 is a series of diagrams illustrating an example of triangular partitioning, which can be considered a special case of geometric partitioning.

In some implementations, a special case of geometric partitioning can include a triangular partitioning mode in which the geometric partitioning is performed to create two triangular regions. For example, FIG. 11 is an example of triangular partitioning. The current block 1100a, 1100b is portioned by line segment 1105a, 1105b into two regions, 1110a, 1110b and 1115a, 1115b. Triangular partitioning can reduce the number of partitioning options thereby reducing computational complexity at the cost of compression. Further, by reducing the number of partitioning options available for the encoder and decoder, the amount of signaling required to convey the triangular partitioning can be reduced, which improves compression efficiency. Some implementations of the current subject matter include performing triangular partitioning at the block level.

When encoding video data utilizing geometric partitioning at the pixel level, line segment 205 (or more specifically points $P_1$ and $P_2$) can be determined. In order to determine the line segment 205 (or more specifically points $P_1$ and $P_2$) that best divides the block when utilizing geometric partitioning at the pixel level, the possible combinations of points $P_1$ and $P_2$ depends on M and N, which are the block width and height. For a block of size M×N, there are (M−1)×(N−1)×3 possible partitions. Identifying the right partition thus can become a computationally expensive task of evaluating motion estimation for all possible partitions, which can increase the amount of time and/or processing power required to encode a video as compared to encoding using rectangular partitioning (e.g., without geometric partitioning at the pixel level). Furthermore, using a geometric partition at the pixel level can create regions that are non-rectangular, which can lead to inefficient memory accesses in the decoder, which can also increase the amount of time and/or processing power required to encode a video as compared to encoding the video using rectangular partitioning (e.g., without geometric partitioning at the pixel level). What constitutes the best or right partition can be determined according to a metric and may change from implementation to implementation.

Some implementations of the current subject matter can include performing geometric partitioning at the block level (e.g., 2×2, 4×4, and the like) rather than at the pixel level. In some implementations, geometric partitioning at the block level can include partitioning a block into non-overlapping and rectangular sub-blocks (e.g., 2×2, 4×4, and the like), and then partitioning the block according to those sub-blocks into non-rectangular regions that can include multiple rectangular sub-blocks.

Figure 3:
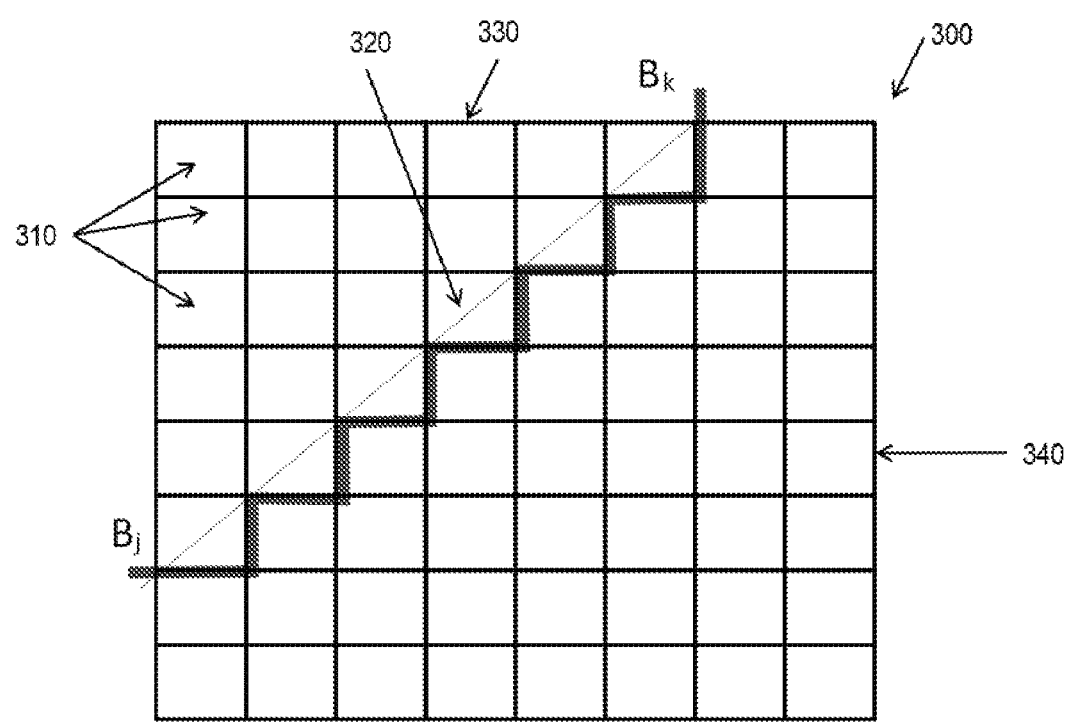
FIG. 3 is a diagram illustrating an example of block level geometric partitioning which can reduce encoding complexity, reduce decoding complexity, and increase compression efficiency.

FIG. 3 is a diagram illustrating an example of block level geometric partitioning, which can reduce encoding complexity, reduce decoding complexity, and increase compression efficiency. An initial rectangular picture or block 300, which may itself be a sub-block of another block (e.g., a node in a coding tree), can be partitioned into rectangular sub-blocks 310. Each rectangular sub-block 310 can have, for example, a pixel size of 2×2, 4×4, 8×8, and the like. In the illustrated example, block 300 is initially partitioned into 64 rectangular sub-blocks 310 (e.g., 8×8 sub-blocks). The rectangular partitioned block 300 can be divided along a line $B_j B_k$ 320 into two non-rectangular regions 330 and 340, also referred to as region 0 and region 1, respectively.

In FIG. 3, sub-blocks $B_j$ and $B_k$ split the block into two regions. Sub-blocks 310 (e.g., 2×2, 4×4, and the like blocks) within region 0 (330) defined by the line segment $B_j B_k$ can be considered to have the same or similar motion and can be represented by the same motion vectors. Similarly, sub-blocks 310 within region 1 (340) can be considered to have the same or similar motion and can be represented by the same motion vectors.

In some implementations, all sub-blocks to the left or above the line segment 320 dividing the initial rectangular block 300 belong to region 0. In some implementations, a sub-block is considered to reside to the left or above the line segment 320 when the pixel located at position 0,0 within the sub-block 310 (e.g., the pixel located at the upper left corner of the block) is to the left or above the line segment 320. In some implementations, all sub-blocks to the right or below the line segment 320 dividing the initial rectangular block 300 below to region 1. In some implementations, all sub-blocks through which the line segment 320 dividing the initial rectangular block 300 belong to region 0. In some implementations, all sub-blocks through which the line segment 320 dividing the initial rectangular block 300 belong to region 1. Other implementations can be possible.

In some implementations, by performing block level geometric partitioning, the number of possible partitions that can occur can be reduced (e.g., as compared to geometric partitioning at the pixel level), which can reduce the computational requirement of evaluating motion estimation to identify the appropriate partition (e.g., to identify the best line segment to partition a block). In some implementations, by performing block level geometric partitioning, non-rectangular regions (e.g., 330 and 340) still contain rectangular sub-blocks, which can be processed more efficiently and can allow for more efficient memory accesses as compared to encoding the video using geometric partitioning at the pixel level.

Block level geometric partitioning can be represented in the bit stream. In some implementations, a block level geometric partitioning mode can be utilized, and appropriate parameters can be signaled in the bitstream. For example, geometric partitions at the block level can be represented in the bit stream by signaling starting and ending sub-block indices that partition the rectangular region (e.g., signal indices for $B_j$ and $B_k$). The straight line segment connecting the signaled sub-blocks can characterize the partition. Other parameters are possible. Block level geometric partitioning can reduce complexity and increase compression efficiency.

Figure 4:
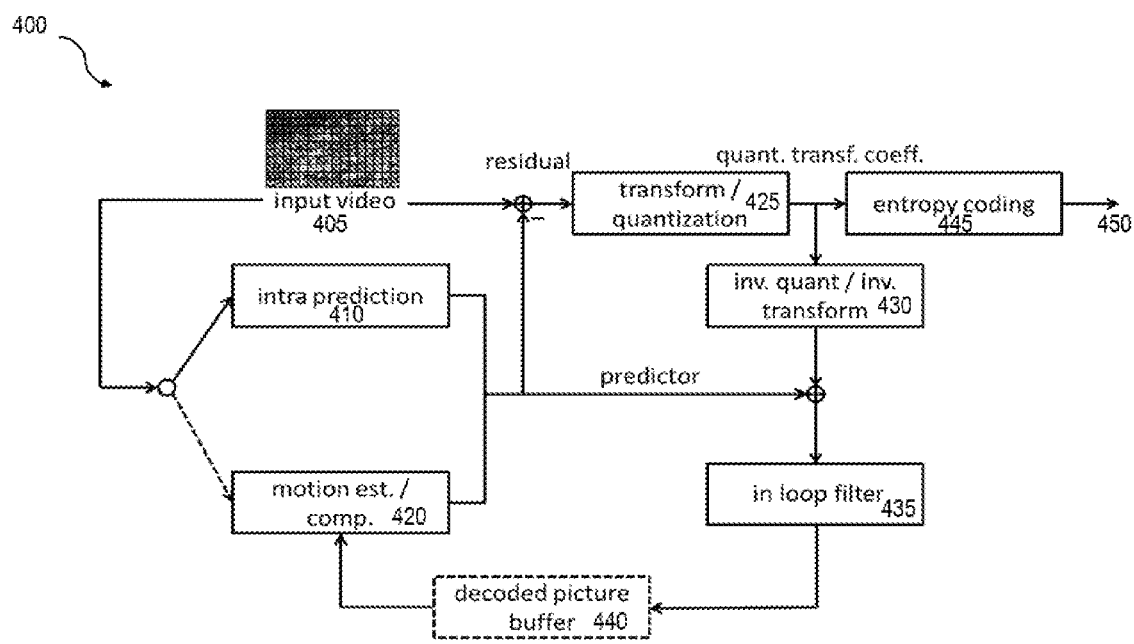
FIG. 4 is a system block diagram illustrating an example video encoder capable of performing block level geometric partitioning.

FIG. 4 is a system block diagram illustrating an example video encoder 400 capable of performing block level geometric partitioning. The example video encoder 400 receives an input video 405, which can be initially segmented or dividing according to a processing scheme, such as a tree-structured macro block partitioning scheme (e.g., quad-tree plus binary tree). An example of a tree-structured macro block partitioning scheme can include partitioning a picture frame into large block elements called coding tree units (CTU). In some implementations, each CTU can be further partitioned one or more times into a number of sub-blocks called coding units (CU). The final result of this portioning can include a group of sub-blocks that can be called predictive units (PU). Transform units (TU) can also be utilized. Such a partitioning scheme can include performing block level geometric partitioning according to some aspects of the current subject matter.

The example video encoder 400 includes an intra prediction processor 415, a motion estimation/compensation processor 420 (also referred to as an inter prediction processor) capable of supporting block level geometric partitioning, a transform/quantization processor 425, an inverse quantization/inverse transform processor 430, an in-loop filter 435, a decoded picture buffer 440, and an entropy coding processor 445. In some implementations, the motion estimation/compensation processor 420 can perform block level geometric partitioning. Bit stream parameters that signal geometric partitioning modes can be input to the entropy coding processor 445 for inclusion in the output bit stream 450.

In operation, for each block of a frame of the input video 405, whether to process the block via intra picture prediction or using motion estimation/compensation can be determined. The block can be provided to the intra prediction processor 410 or the motion estimation/compensation processor 420. If the block is to be processed via intra prediction, the intra prediction processor 410 can perform the processing to output the predictor. If the block is to be processed via motion estimation/compensation, the motion estimation/compensation processor 420 can perform the processing including use of block level geometric partitioning to output the predictor.

A residual can be formed by subtracting the predictor from the input video. The residual can be received by the transform/quantization processor 425, which can perform transformation processing (e.g., discrete cosine transform (DCT)) to produce coefficients, which can be quantized. The quantized coefficients and any associated signaling information can be provided to the entropy coding processor 445 for entropy encoding and inclusion in the output bit stream 450. The entropy encoding processor 445 can support encoding of signaling information related to block level geometric partitioning. In addition, the quantized coefficients can be provided to the inverse quantization/inverse transformation processor 430, which can reproduce pixels, which can be combined with the predictor and processed by the in loop filter 435, the output of which is stored in the decoded picture buffer 440 for use by the motion estimation/compensation processor 420 that is capable of supporting block level geometric partitioning.

Figure 5:
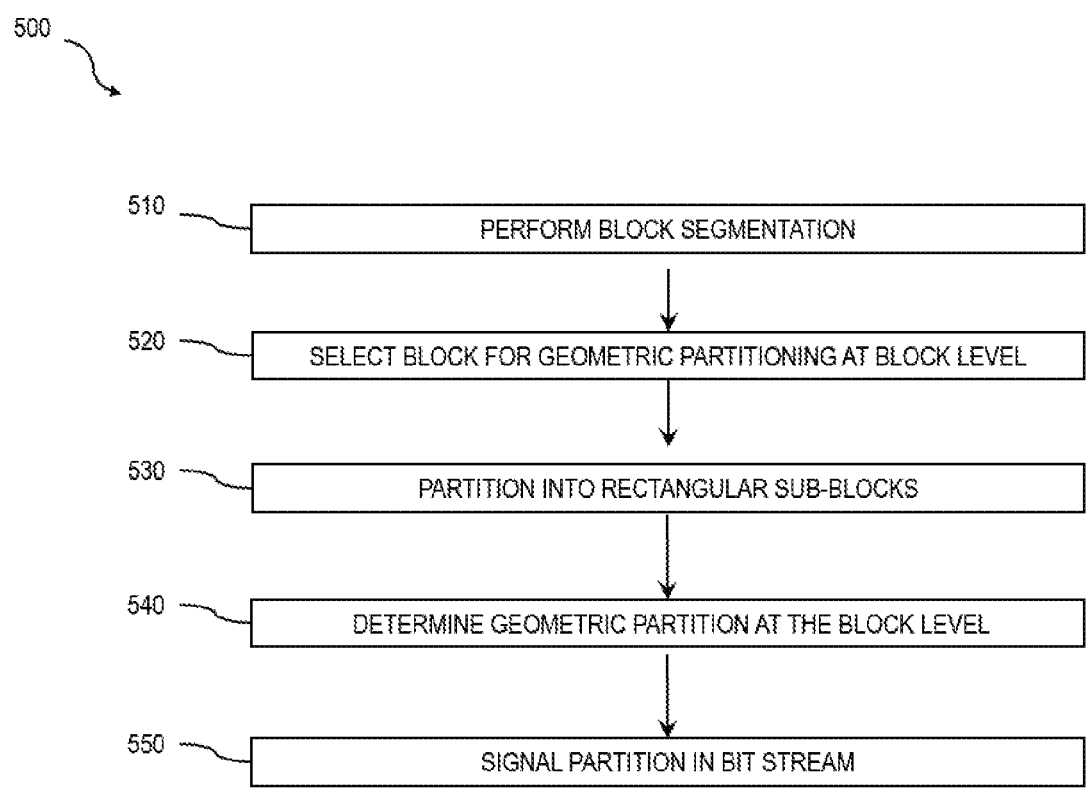
FIG. 5 is a process flow diagram illustrating an example process of encoding a video with block level geometric partitioning according to some aspects of the current subject matter.

FIG. 5 is a process flow diagram illustrating an example process 500 of encoding a video with block level geometric partitioning according to some aspects of the current subject matter that can reduce encoding complexity while increasing compression efficiency. At 510, a video frame can undergo initial block segmentation, for example, using a tree-structured macro block partitioning scheme that can include partitioning a picture frame into CTUs and CUs. At 520, a block can be selected for block level geometric partitioning. The selection can include identifying according to a metric rule that the block is to be processed according to a block level geometric partitioning mode. At 530, the selected block can be partitioned into rectangular sub-blocks. Each rectangular sub-block can have, for example, a pixel size of 2×2, 4×4, 8×8, and the like.

At 540, a geometric partition at the block level can be determined. A line (e.g., $B_jB_k$) can be determined that will separate the pixels contained within the block according to their inter frame motion into two non-rectangular regions (e.g., region 0 and region 1) such that pixels and/or sub-blocks within one of the regions (e.g., region 0) have similar motion and pixels within the other region (e.g., region 1) have similar motion. At 550, the determined geometric partition at the block level can be signaled in the bit stream.

Figure 6:
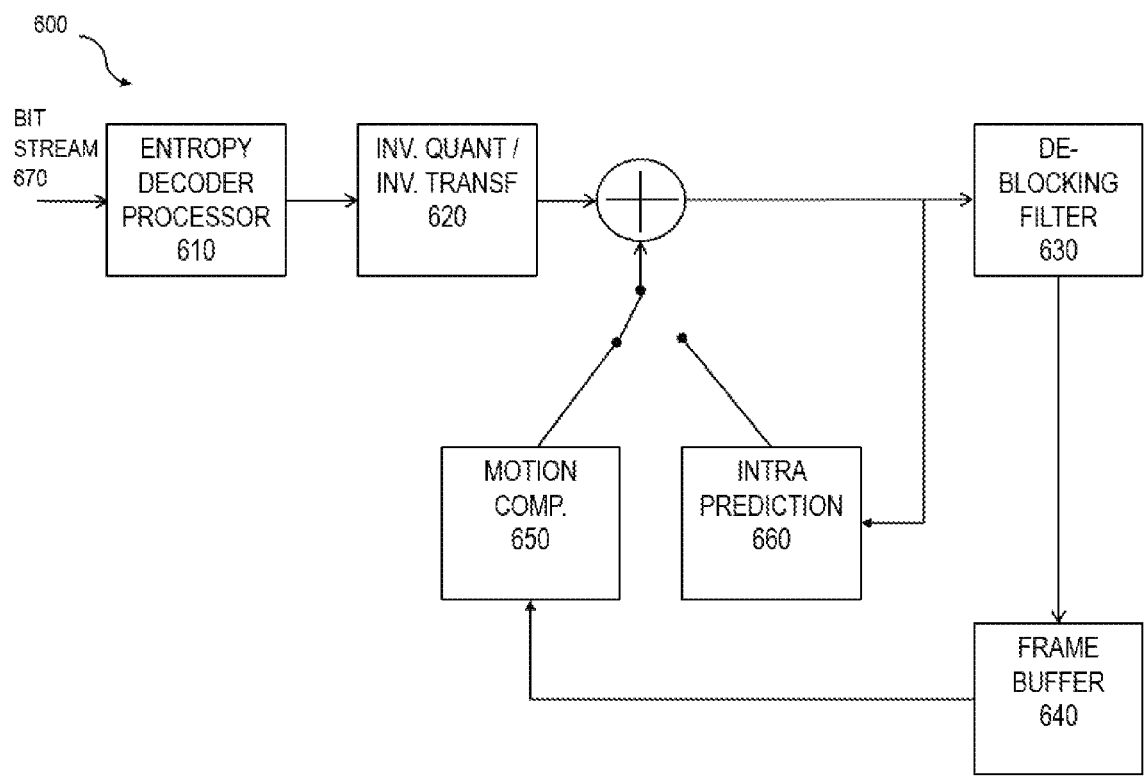
FIG. 6 is a system block diagram illustrating an example decoder capable of decoding a bit stream using block level geometric partitioning.

FIG. 6 is a system block diagram illustrating an example decoder 600 capable of decoding a bitstream 670 using block level geometric partitioning. The decoder 600 includes an entropy decoder processor 610, an inverse quantization and inverse transformation processor 620, a deblocking filter 630, a frame buffer 640, motion compensation processor 650 and intra prediction processor 660. In some implementations, the bitstream 670 includes parameters that signal a geometric partitioning mode including block level geometric partitioning. The motion compensation processor 650 can reconstruct pixel information using block level geometric partitioning as described herein.

In operation, bit stream 670 can be received by the decoder 600 and input to entropy decoder processor 610, which entropy decodes the bit stream into quantized coefficients. The quantized coefficients can be provided to inverse quantization and inverse transformation processor 620, which can perform inverse quantization and inverse transformation to create a residual signal, which can be added to the output of motion compensation processor 650 or intra prediction processor 660 according to the processing mode. The output of the motion compensation processor 650 and intra prediction processor 660 can include a block prediction based on a previously decoded block. The sum of the prediction and residual can be processed by deblocking filter 630 and stored in a frame buffer 640. For a given block, (e.g., CU or PU), when the bit stream 670 signals that the partitioning mode is block level geometric partitioning, motion compensation processor 650 can construct the prediction based on the geometric partition at the block level scheme described herein.

Figure 7:
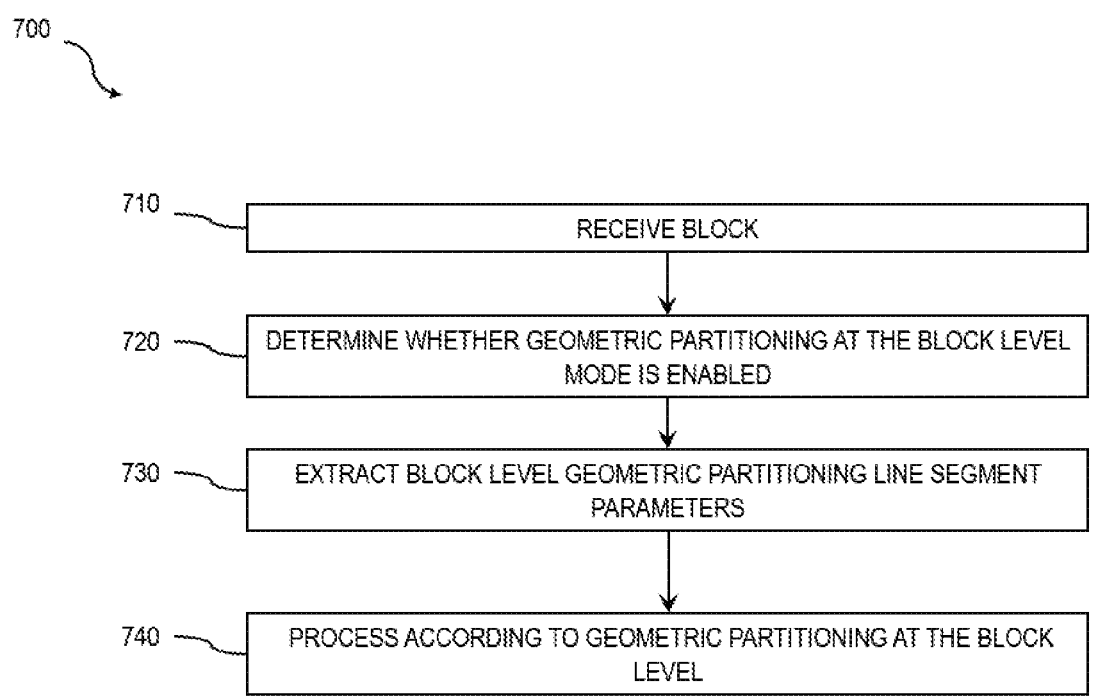
FIG. 7 is a process flow diagram illustrating an example process of decoding a bit stream using geometric partitioning at the block level.

FIG. 7 is a process flow diagram illustrating an example process 700 of decoding a bit stream using geometric partitioning at the block stream. At 710, a block (e.g., CTU, CU, PU) is received. Receiving can include extracting and/or parsing the block and associated signaling information from the bit stream. At 720, whether block level geometric partitioning mode is enabled (e.g., true) for the block can be determined. This can include, for example, determining whether a triangular partitioning mode is enabled. If the block level geometric partitioning mode is not enabled (e.g., false), the decoder can process the block using an alternative partitioning mode. If the block level geometric partitioning mode is enabled (e.g., true), at 730, the decoder can extract or determine one or more parameters that characterize the block level geometric partitioning. These parameters can include, for example, the indices of the start and end of the line segment (e.g., $B_jB_k$), a location of an upper left corner of the block or an upper right corner of the block, an index characterizing the partitioning (e.g., to a predefined template or regular partition), and the like. Extraction or determining can include identifying and retrieving the parameters from the bit stream (e.g., parsing the bitstream). At 740, the block can be processed according to block level geometric partitioning (e.g., to produce a prediction), including determining the associated motion information for each region.

Block level geometric partitioning can include determining non-overlapping and rectangular sub-blocks (e.g., 2×2, 4×4, and the like), and then partitioning the block according to those sub-blocks, which can include assigning each sub-block to the first region or the second region.

Some implementations of the current subject matter include partitioning a rectangular region into an adaptive number of flexible geometric regions that can be more efficient to compute. Geometric partitioning can be performed at the block level (e.g., 2×2, 4×4, and the like) rather than at the pixel level. In some implementations, block level geometric partitioning can include partitioning a block into non-overlapping and rectangular sub-blocks (e.g., 2×2, 4×4, and the like), and then partitioning the block according to those sub-blocks into three or more non-rectangular regions, each of which can include multiple rectangular sub-blocks. Geometric partitions at the block level with an adaptive number of regions can be determined (e.g., implemented) by signaling starting and ending sub-block indices that partition the block. The straight lines connecting the signaled sub-blocks can characterize the partitions. Block level geometric partitioning with an adaptive number of regions can reduce complexity and increase compression efficiency.

Figure 8:
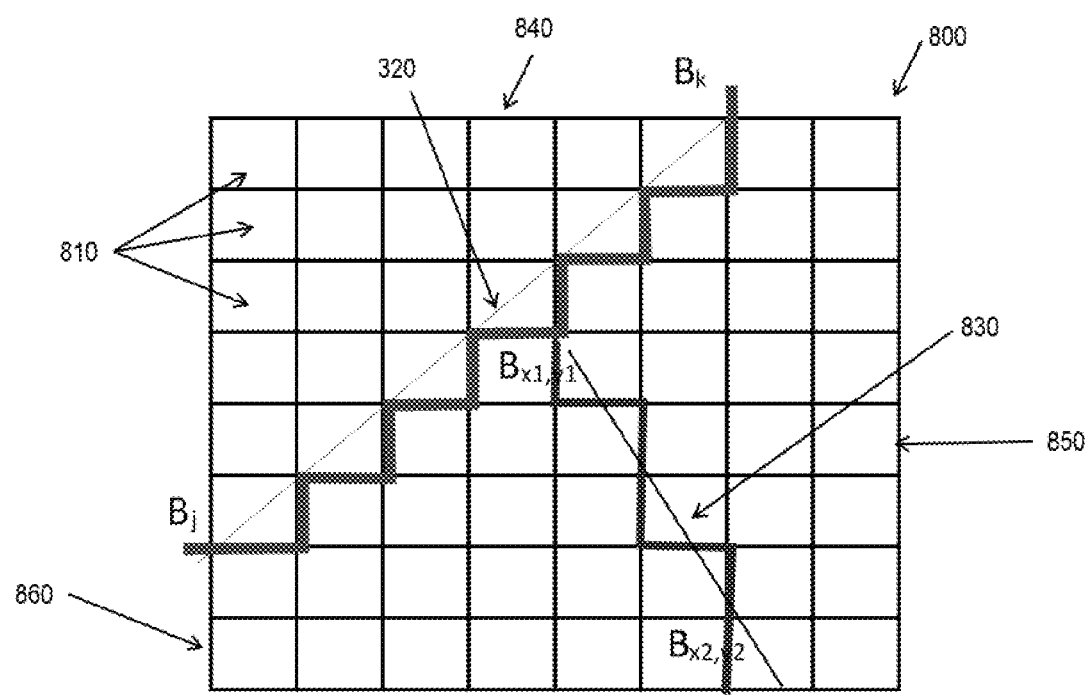
FIG. 8 is a diagram illustrating an example of adaptive block level geometric partitioning, which can reduce encoding complexity, reduce decoding complexity, and increase compression efficiency.

FIG. 8 is a diagram illustrating an example of adaptive block level geometric partitioning, which can reduce encoding complexity, reduce decoding complexity, and increase compression efficiency. An initial rectangular picture or block 800, which may itself be a sub-block of another block (e.g., may be a CTU, CU, PU, and the like), can be partitioned into rectangular sub-blocks 810. Each rectangular sub-block 810 can have, for example, a pixel size of 2×2, 4×4, 8×8, and the like. In the illustrated example, block 800 is initially partitioned into 64 rectangular sub-blocks 810 (e.g., 8×8 sub-blocks). The rectangular partitioned block 800 can be divided along two or more lines. In the illustrated example, the rectangular partitioned block 800 is divided along a line $B_jB_k$ 820 and along line $B_{x1,y1}B_{x2,y2}$ 830 into three non-rectangular regions 840, 850, and 860, also referred to as region 0, region 1, and region 2, respectively. In some implementations, addition divisions are possible, e.g., to form 4, 5, 6, 7, 8, 9, or more regions.

In some implementations, partitioning occurs iteratively in that a first partition can be determined (e.g., determine line $B_jB_k$ 820 and associated regions) forming two regions, and then one of those regions is further partitioned. For example, the partitioning described with reference to FIG. 3 can be performed to partition a block into two regions (e.g., region 0 and region 1). One of those regions (e.g., region 1) can be further partitioned (e.g., to form new region 1 and region 2). The process can continue to perform block level geometric partitioning until a stopping criterion is reached.

In some implementations, all sub-blocks to the left or above a given line segment 830, 840 dividing the rectangular block 800 belong to the region occupying the above left of the respective line. For example, sub-blocks 810 residing along line $B_jB_k$ 820 can belong to region 0 (840) and sub-blocks 810 residing along line $B_{x1,y1}B_{x2,y2}$ 830 can belong to region 1 (850). In some implementations, a sub-block is considered to reside to the left or above the respective line segment 830, 840 when the pixel located at position 0,0 within the sub-block 810 (e.g., the pixel located at the upper left corner of the block) is to the left or above the respective line segment 830, 840.

In some implementations, by performing block level geometric partitioning with an adaptive number of regions, the number of possible partitions that can occur can be reduced (e.g., as compared to geometric partitioning at the pixel level), which can reduce the computational requirement of evaluating motion estimation to identify the appropriate partition (e.g., to identify the best line segment to partition a block). In some implementations, by performing geometric partitions at the block level with an adaptive number of regions, non-rectangular sub-block regions (e.g., 840, 850, 860) still contain rectangular sub-blocks, which can be processed more efficiently and can allow for more efficient memory accesses as compared to encoding the video using geometric partitioning at the pixel level. In some implementations, by performing geometric partitions at the block level with an adaptive number of regions, motion information can be more accurately represented, thereby reducing the size of the residual.

Geometric partitions at the block level with an adaptive number of regions can be represented in the bit stream. In some implementations, a block level geometric partitioning mode can be utilized, and appropriate parameters can be signaled in the bitstream. For example, geometric partitions at the block level with an adaptive number of regions can be represented in the bit stream by signaling starting and ending sub-block indices that partition the rectangular region (e.g., signal indices for $B_j$, $B_k$, $B_{x1,y1}$ and $B_{x2,y2}$). Straight line segments connecting pairs of the signaled sub-blocks can characterize the partitions. Other parameters are possible. Geometric partitions at the block level with an adaptive number of regions can reduce complexity and increase compression efficiency.

Some implementations of the current subject matter include approaches to signaling of partitioning of a rectangular region into flexible geometric regions that can be more efficient to compute. The approaches to signaling can relate to geometric partitioning, which can be performed at the block level (e.g., 2×2, 4×4, and the like) rather than at the pixel level. In some implementations, block level geometric partitioning can include partitioning a block into non-overlapping and rectangular sub-blocks (e.g., 2×2, 4×4, and the like), and then partitioning the block according to those sub-blocks into non-rectangular regions that can include multiple rectangular sub-blocks. Geometric partitions at the block level can be determined, for example, by signaling indices for two sub-blocks (e.g., a starting and ending block indices) that reside along a partition line segment that partitions the block; by signaling one or more regular (e.g., template) geometric partitions that are predefined; and/or by signaling an angle and sub-block indices for a block that resides along a partition line segment. The straight line segment derived from the signal can characterize the partition. Block level geometric partitioning can reduce complexity and increase compression efficiency.

In some implementations, signaling of blocks can be performed by including position indices of two sub-blocks (e.g., a starting and ending sub-block indices) that reside along a partition line segment that partition the block. An example of this approach is illustrated with reference to FIG. 3 where indices $B_j$ and $B_k$ can be included in the bit stream, e.g., in a picture header. Furthermore, each region can be further sub-divided by specifying another pair of sub-block indices. In some implementations, an offset can be signaled indicating that the block level geometric partitioning for another previously processed block (e.g., another coding unit) can be used as modified by the offset.

In some implementations, signaling can be performed by signaling an angle and position indices for a sub-block that resides along a partition line segment. The combination of the sub-block and angle can indicate a line segment (e.g., in polar coordinate system) that terminates at the edge of the block.

In some implementations, signaling can be performed by including an index to one or more regular (e.g., template) geometric partitions that are predefined. These regular geometric partitions can specify a set of predetermined angles.

Figure 9:
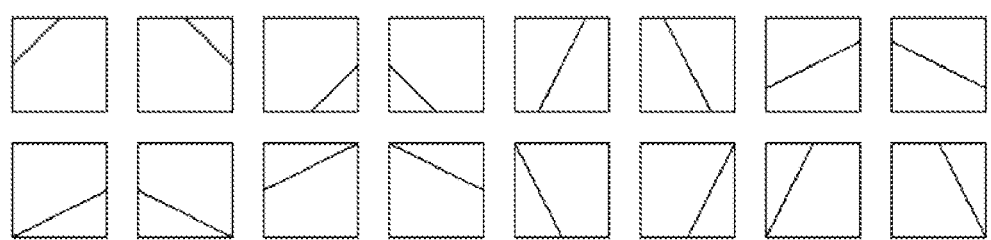
FIG. 9 is a series of diagrams illustrating example regular geometric partitions that can be predefined.

FIG. 9 is a series of diagrams illustrating example regular geometry partitions that can be predefined. In FIG. 9, there are 16 different predetermined regular geometry partitions, which can be signaled according to an index.

Figure 10:
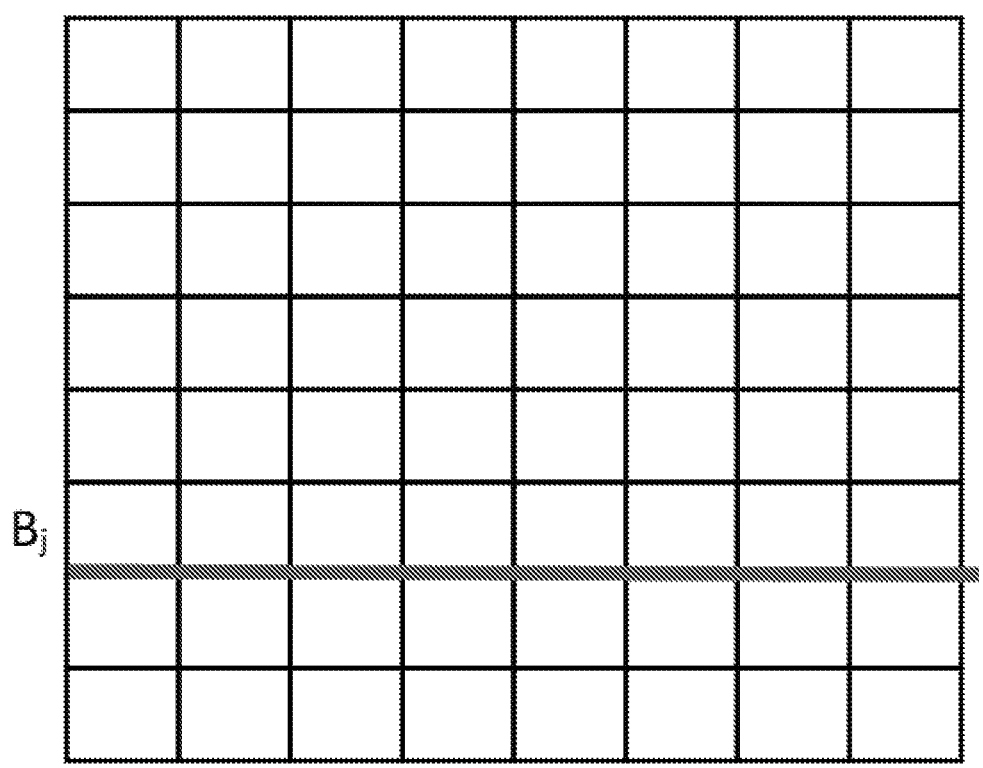
FIG. 10 is a diagram illustrating an example block level geometric partition result from using a pre-determined angle of 90 degrees, according to some example implementations of the current subject matter.

Regular regions can be considered as regions partitioned by lines connecting at a predetermined angle (e.g., 45 degrees). In some implementations, for regular regions, only the starting index can be signaled, and the line segment can terminate at the block boundary. A pre-determined angle of 90 degrees can create rectangular regions, as illustrated in FIG. 10.

FIG. 11 is a series of diagrams illustrating example regular geometry partitions that can be predefined for triangular partitioning mode. Where triangular partitioning mode is utilized, partitioning templates can include a partitioning defined by line segment 1105a or 1105b. These predefined template partitions can be signaled by specifying an index (e.g., 0 or 1) in the bitstream. As another example, these predefined template partitions can be signaled by specifying a location (e.g., luma location) of the upper left corner of the current block (to specify partitioning according to 1105a) or the location of the upper right corner block (to specify partitioning according to 1105b). By specifying a corner location of a current block, it can be implied that the partition will occur along a line from the specified corner to an opposite corner.

Although a few variations have been described in detail above, other modifications or additions are possible. For example, in some implementations, block level geometric partitioning can apply to symmetric blocks (8×8, 16×16, 32×32, 64×64, 128×128, and the like) as well as on various asymmetric blocks (8×4, 16×8, and the like). Block level geometric partitioning can utilize different symmetric sub-block sizes such as 2×2, 4×4, 8×8, 16×16, 32×32, 64×64, 128×128, and the like, and/or different asymmetric sub-block sizes such as 4×2, 8×4, 16×8, and the like.

The partitioning can be signaled in the bit stream based on rate-distortion decisions in the encoder. The coding can be based on a combination of regular pre-defined partitions (e.g., templates), temporal and spatial prediction of the partitioning, and additional offsets. Each geometrically partitioned at the block level region can utilize motion compensated prediction or intra-prediction. The boundary of the predicted regions can be smoothed before the residual is added. For residual coding, the encoder can select between a regular rectangular DCT for the whole block and a Shape Adaptive DCT for each region and/or sub-block.

In some implementations, a quadtree plus binary decision tree (QTBT) can be implemented. In QTBT, at the Coding Tree Unit level, the partition parameters of QTBT are dynamically derived to adapt to the local characteristics without transmitting any overhead. Subsequently, at the Coding Unit level, a joint-classifier decision tree structure can eliminate unnecessary iterations and control the risk of false prediction. In some implementations, block level geometric partitioning can be available as an additional partitioning option available at every leaf node of the QTBT.

In some implementations, a decoder includes a block level partition processor that generates the block level geometric partition for the current block and provides all partition-related information for dependent processes. The partition processor can directly influence motion compensation as it can be performed segment-wise in case a block is geometrically partitioned. Further, the partition processor can provide shape information to the intra-prediction processor and the transform coding processor.

In some implementations, additional syntax elements can be signaled at different hierarchy levels of the bitstream. For enabling block level geometric partitioning for an entire sequence, an enable flag can be coded in a Sequence Parameter Set (SPS). Further, a CTU flag can be coded at the coding tree unit (CTU) level to indicate, whether any coding units (CU) use geometric partitioning. A CU flag can be coded to indicate whether the current coding unit utilizes block level geometric partitioning. The parameters which specify the line segment on the block can be coded. For each region, a flag can be decoded, which specifies whether the current region is inter- or intra-predicted.

In some implementations, a minimum region size can be specified.

The subject matter described herein provides many technical advantages. For example, some implementations of the current subject matter can provide for partitioning of blocks that reduces complexity while increasing compression efficiency. In some implementations, blocking artifacts at object boundaries can be reduced.

Some implementations of the current subject matter include partitioning a rectangular region into flexible geometric regions that can be more efficient to compute. Geometric partitioning can be performed at the block level (e.g., 2×2, 4×4, and the like) rather than at the pixel level. In some implementations, geometric partitioning at the block level can include partitioning a block into non-overlapping and rectangular sub-blocks (e.g., 2×2, 4×4, and the like), and then partitioning the block according to those sub-blocks into non-rectangular regions that can include multiple rectangular sub-blocks. Geometric partitions at the block level can be determined (e.g., implemented) by signaling starting and ending sub-block indices that partition the block. The straight line connecting the signaled sub-blocks can characterize the partition. Block level geometric partitioning can reduce complexity and increase compression efficiency.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random-access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A decoder comprising:
   circuitry configured to receive a bitstream, the bitstream comprising a picture including a rectangular array of coded blocks, the rectangular array of coded blocks having been encoded at an encoder by forming a block based geometric partition defined by a plurality of orthogonal block boundaries within the array by assigning a first plurality of blocks in the array determined to be on one side of an angled line segment a first common motion vector and by assigning a second plurality of blocks in the array determined to be on the other side of the angled line segment a second common motion vector different than the first common motion vector, wherein the rectangular array is formed by a coding tree unit and each block is formed by a coding unit in the coding tree unit;
   reconstruct the array of blocks by decoding the blocks in the first plurality using the first common motion vector and the blocks in the second plurality using the second common motion vector, whereby the block based geometric partition defined by a plurality of orthogonal block boundaries in the array is reconstructed.

2. The decoder of claim 1, wherein the first plurality of blocks includes blocks sized 2×2 or greater.

3. The decoder of claim 1, wherein the second plurality of blocks includes blocks sized 2×2 or greater.

4. The decoder of claim 1, wherein the block level geometric partitioning mode is signaled in the bitstream.

5. The decoder of claim 1, wherein the block is partitioned into the first plurality of blocks and the second plurality of blocks along a line segment characterized by a location specifying the upper left corner location of the block or an upper right corner location of the block.

6. The decoder of claim 1, further comprising:
   an entropy decoder processor configured to receive the bit stream and decode the bitstream into quantized coefficients;
   an inverse quantization and inverse transformation processor configured to process the quantized coefficients including performing an inverse discrete cosine;
   a deblocking filter; a frame buffer; and
   an intra prediction processor.

7. The decoder of claim 1, wherein the bitstream includes a parameter indicating whether block level geometric partitioning mode is enabled for the block.

8. The decoder of claim 1, wherein each block forms part of a quadtree plus binary decision tree.

9. A decoder comprising:
   circuitry configured to receive a bitstream, the bitstream comprising a picture including a rectangular array of coded blocks, the rectangular array of coded blocks having been encoded at an encoder by forming a block based geometric partition defined by a plurality of orthogonal block boundaries within the array by assigning a first plurality of blocks in the array determined to be on one side of an angled line segment a first common motion vector and by assigning a second plurality of blocks in the array determined to be on the other side of the angled line segment a second common motion vector different than the first common motion vector, wherein each block of the rectangular array is determined to be on one side or the other side of the angled line segment depending on whether an origin pixel location of the block is on one side or the other side of the line segment; and
   reconstruct the array of blocks by decoding the blocks in the first plurality using the first common motion vector and the blocks in the second plurality using the second common motion vector, whereby the block based geometric partition defined by a plurality of orthogonal block boundaries in the array is reconstructed.

10. The decoder of claim 9, wherein the block level geometric partitioning mode is signaled in the bitstream.

11. The decoder of claim 9, wherein the block is partitioned into the first plurality of blocks and the second plurality of blocks along a line segment characterized by a location specifying the upper left corner location of the block or an upper right corner location of the block.

* * * * *